(12) United States Patent
Ueno et al.

(10) Patent No.: US 7,305,846 B2
(45) Date of Patent: Dec. 11, 2007

(54) FREEZING DEVICE

(75) Inventors: Takeo Ueno, Osaka (JP); Masaaki Takegami, Osaka (JP); Hiroto Nakajima, Osaka (JP); Koichi Kita, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 240 days.

(21) Appl. No.: 10/551,428

(22) PCT Filed: May 28, 2004

(86) PCT No.: PCT/JP2004/007799

§ 371 (c)(1),
(2), (4) Date: Oct. 3, 2005

(87) PCT Pub. No.: WO2004/106819

PCT Pub. Date: Dec. 9, 2004

(65) Prior Publication Data

US 2006/0272345 A1 Dec. 7, 2006

(30) Foreign Application Priority Data

May 30, 2003 (JP) .............................. 2003-154090

(51) Int. Cl.
*F25B 47/00* (2006.01)
*F25B 13/00* (2006.01)
(52) U.S. Cl. ...................................... 62/278; 62/324.1
(58) Field of Classification Search .................. 62/278, 62/126, 199, 238.7, 324.1, 510, 151, 156, 62/157, 272
See application file for complete search history.

(56) References Cited

U.S. PATENT DOCUMENTS

| | | | | |
|---|---|---|---|---|
| 4,411,140 A | * | 10/1983 | Katsumata et al. | 62/324.2 |
| 4,748,823 A | * | 6/1988 | Asano et al. | 62/239 |
| 6,101,983 A | * | 8/2000 | Anand et al. | 122/4 D |
| 6,637,230 B2 | * | 10/2003 | Iwanami et al. | 62/244 |
| 6,698,217 B2 | * | 3/2004 | Tanimoto et al. | 62/175 |
| 6,722,156 B2 | * | 4/2004 | Tanimoto et al. | 62/510 |
| 2002/0157412 A1 | * | 10/2002 | Iwanami et al. | 62/236 |

(Continued)

FOREIGN PATENT DOCUMENTS

JP 8-261609 A 10/1996

(Continued)

*Primary Examiner*—Mohammad M. Ali
(74) *Attorney, Agent, or Firm*—Birch, Stewart, Kolasch & Birch, LLP

(57) ABSTRACT

In a refrigerant circuit (20), a refrigerator circuit (110) and a freezing circuit (30) are connected in parallel to an outdoor circuit (40). In the freezing circuit (30), a freezer circuit (130) and a booster circuit (140) are connected in series. A booster compressor (141) and a four-way switch valve (142) are provided in the booster circuit (140). During the time when a freezer heat exchanger (131) performs cooling operation for cooling the inside air, refrigerant evaporated in the freezer heat exchanger (131) is compressed in the booster compressor (141), and then, is sucked into a variable capacitance compressor (41). On the other hand, during defrosting of the freezer heat exchanger (131), the refrigerant evaporated in a refrigerator heat exchanger (111) is compressed in the booster compressor (141), and then, is supplied to the freezer heat exchanger (131). The refrigerant condensed in the freezer heat exchanger (131) during the defrosting operation is sent back to the refrigerator heat exchanger (111).

3 Claims, 9 Drawing Sheets

U.S. PATENT DOCUMENTS

2003/0010047 A1   1/2003  Shimoda
2003/0226370 A1* 12/2003  Tanimoto et al. .......... 62/259.2
2003/0233836 A1* 12/2003  Tanimoto et al. ............. 62/175

FOREIGN PATENT DOCUMENTS

| | | | |
|---|---|---|---|
| JP | 9-324978 A | 12/1997 |
| JP | 11-94406 A | 4/1999 |
| JP | 11-142002 A * | 5/1999 |
| JP | 2001-183037 A | 7/2001 |
| JP | 2002-228297 A | 8/2002 |
| JP | 2003-130473 A | 5/2003 |

* cited by examiner

FREEZING DEVICE

TECHNICAL FIELD

The present invention relates to refrigerating apparatuses provided with a plurality of heat exchangers for cooling the inside of refrigerators and the like.

BACKGROUND ART

Refrigerating apparatuses that performs a refrigeration cycle has been conventionally known and are widely used as coolers for refrigerators for storing food. For example, Japanese Patent Application Laid Open Publication No. 2002-228297 discloses a refrigerating apparatus provided with a plurality of heat exchangers for cooling the inside of a refrigerator. In this refrigerating apparatus, a refrigerator heat exchanger for cooling the inside of the refrigerator and a freezer heat exchanger for cooling the inside of a freezer are connected in parallel to one outdoor unit. Besides a main compressor of the outdoor unit, the sub compressor is provided between the freezer heat exchanger and the outdoor unit in the refrigerating apparatus. In the refrigerating apparatus, a single-stage refrigeration cycle using the refrigerator heat exchanger as an evaporator and a two-stage compression refrigeration cycle using the freezer heat exchanger as an evaporator and the sub compressor as a lower-stage compressor are performed in one refrigerant circuit.

In the above refrigerating apparatus, the evaporation temperature of the refrigerant is comparatively set low in the freezer heat exchanger connected in series with the sub compressor. Accordingly, frosting is a severe problem in this freezer heat exchanger. In detail, moisture in air attaches to the freezer heat exchanger, so that the freezer heat exchanger is frosted, which inhibits the cooling of air inside the freezer. Therefore, it is necessary to melt the frost attaching to the freezer heat exchanger, namely, to defrost the freezer heat exchanger.

For defrosting the freezer heat exchanger, an electric heater is used generally, as disclosed in Japanese Patent Application Laid Open Publication No. 09-324978. In detail, in general refrigerating apparatuses, defrosting operation is performed in a manner that air heated by electric heaters is supplied to the freezer heat exchangers to warm the air to melt frost attaching to the freezer heat exchangers by the heated air.

Or, so-called hot gas bypasses may be employed for defrosting the freezer heat exchangers, as disclosed in Japanese Patent Application Laid Open Publication No. 2001-183037. In detail, the gazette proposes that the refrigerant circulates only between the compressor and the freezer heat exchanger and the gas refrigerant of a comparatively high temperature discharged from the compressor is introduced into the freezer heat exchanger to melt frost.

Problems that the Invention is to Solve

As described above, the above refrigerating apparatuses generally use the electric heaters for defrosting the freezer heat exchangers. In this case, however, the air heated by the electric heater is supplied to the freezer heat exchanger for melting frost, which may leads to the heated air flowing into the inside of the freezer to increase the temperature inside the freezer. Further, frost attaching to the freezer heat exchanger has to be warmed from the outside by air and it takes a long period of time to defrost the freezer heat exchanger (40 minutes, for example).

The above problems have been solved to some extent by defrosting the freezer heat exchanger by the hot gas bypass. In the defrosting by the hot gas bypass, high temperature refrigerant is introduced into the heat transfer tube of the freezer heat exchanger to warm frost attaching to the freezer heat exchanger from the inside. Therefore, temperature increase in the inside of the freezer during the defrosting of the freezer heat exchanger is suppressed, in comparison with that in the case of defrosting by the electric heater.

However, during the defrosting by the hot gas bypass, the refrigerant only circulates between the compressor and the freezer heat exchanger and only heat that the compressor provides to the refrigerant can be utilize for melting frost. For this reason, a long period of time is still required for defrosting the freezer heat exchanger.

In addition, the refrigerant supplied to the freezer heat exchanger is sucked merely into the compressor again and is not utilized other than for defrosting the freezer heat exchanger. In other words, the compressor is driven only for defrosting the freezer heat exchanger during the defrosting of the freezer heat exchanger. Therefore, as in the case using the electric heater, power consumption is increased in association with the defrosting of the freezer heat exchanger, with a result of increase in running cost of the refrigerating apparatus.

The present invention has been made in view of the above problems and has its object of reducing, in a refrigerator provided with a plurality of heat exchangers for cooling the inside of a refrigerator and the like, a time required for defrosting heat exchangers for cooling the inside and reducing power consumption of the refrigerating apparatus, and in its turn, for reducing the running cost.

SUMMARY OF THE INVENTION

A first invention is directed to a refrigerating apparatus that is provided with a refrigerant circuit (20) in which a first cooling circuit (110, 120) including a first heat exchanger (111, 121) for cooling inside and a second cooling circuit (30) including a second heat exchanger (131) for cooling inside and a sub compressor (141), which are connected in series, are connected in parallel to a heat source side circuit (40) including a heat source side heat exchanger (43) and a main compressor (41) and that performs a refrigeration cycle by circulating refrigerant in the refrigerant circuit (20). In the refrigerant circuit (20), a switching mechanism (142) is provided which switches between a first operation where the sub compressor (141) sucks the refrigerant from the second heat exchanger (131) and discharges it to an intake side of the main compressor (41) and a second operation where the sub compressor (141) sucks the refrigerant from the first heat exchanger (111, 121) and discharges it to the second heat exchanger (131), and the second operation is performed in the refrigerant circuit (20) and the refrigerant is sent from the second heat exchanger (131) to the first heat exchanger (111, 121) during defrosting operation for defrosting the second heat exchanger (131).

In a second invention, an expansion valve (132) of which opening is variable is provided in the second cooling circuit (30) and control means (201) is provided which keeps the expansion valve (132) to be opened fully during the defrosting operation, in the first invention.

In a third invention, a bypass path (150) is provided through which the refrigerant passes bypassing the sub compressor (141) in the refrigerant circuit (20) only during a halted state of the sub compressor (141), and control means (20) is provided which halts once the sub compressor (141) when the second operation is exchanged to the first operation at termination of the defrosting operation, and then, starts the sub compressor (141) after a predetermined time period elapses, in the first invention.

Operation

In the first invention, the refrigerant circuit (20) is provided in the refrigerating apparatus (10). In the refrigerant circuit (20), the first cooling circuit (110, 120) and the second cooling circuit (30) are connected in parallel to the heat source side circuit (40).

The switching mechanism (42) is provided in the refrigerant circuit (20). The switching mechanism (42) is operable to switch between the first operation and the second operation in the refrigerant circuit (20). In either the first operation and the second operation, the refrigerant supplied from the heat source side circuit (40) to the first cooling circuit (110, 120) is evaporated in the first heat exchanger (111, 112), and the, is sucked into the main compressor (41). In the first operation, the refrigerant supplied from the heat source side circuit (40) to the second cooling circuit (30) is evaporated in the second heat exchanger (131), is sucked into the sub compressor (141) to be compressed in the sub compressor (141), and then, is sucked into the main compressor (41).

In this invention, the refrigerating apparatus (10) performs the defrosting operation. This defrosting operation is performed for defrosting the second heat exchanger (131). During the defrosting operation, the second operation is performed in the refrigerant circuit (20). In the second operation, the sub compressor (141) sucks and compresses the refrigerant evaporated in the first heat exchanger (111, 121), and then, supplies the thus compressed refrigerant to the second heat exchanger (131). In the second heat exchanger (131), frost attaching thereto is heated and melted by the refrigerant supplied from the sub compressor (141). Accordingly, both the heat that the refrigerant absorbs in the first heat exchanger (111, 121) and the heat provided to the refrigerant in the sub compressor (141) are utilized for defrosting the second heat exchanger (131). The refrigerant condensed by heat radiation in the second heat exchanger (131) is sent back to the first heat exchanger (111, 121) to be utilized again for cooling the inside of the refrigerator. Namely, the refrigerant supplied for defrosting from the sub compressor (141) to the second heat exchanger (131) is sent back to the first heat exchanger (111, 121) to be utilized also for cooling the inside of the refrigerator.

In the second invention, the expansion valve (132) of which opening is variable is provided in the second cooling circuit (30). In the first operation, the refrigerant supplied from the heat source side circuit (40) to the second cooling circuit (30) passes through the expansion valve (132), is reduced in pressure, and then, is introduced into the second heat exchanger (131). During the defrosting operation, the control means (201) keeps the expansion valve (132) of the second cooling circuit (30) to be opened fully. The second operation is performed during the defrosting operation and the refrigerant discharged from the sub compressor (141) is supplied to the second heat exchanger (131). Then, the refrigerant condensed by heat radiation in the second heat exchanger (131) is sent to the first heat exchanger (111, 121) via the expansion valve (132) that is opened fully.

In the third invention, the bypass path (150) is provided in the refrigerant circuit (20). When the defrosting operation terminates, the second operation is exchanged to the first operation in the refrigerant circuit (20). At that time, the switching control means (202) performs a predetermined operation. In detail, the control means (202) halts once the sub compressor (141), which is driven during the second operation, and then, starts the sub compressor (141) after a predetermined time elapses.

Herein, the refrigerant is supplied from the sub compressor (141) to the second heat exchanger (131) during the second operation. The refrigerant condensed in the second heat exchanger (131) is dominantly sent to the first heat exchanger (111, 121) and part thereof remains in the second heat exchanger (131). For this reason, mere operation exchange to the first operation by operating the switching mechanism (142) leads to sucking of liquid refrigerant remaining in the second heat exchanger (131) into the sub compressor (141), thereby inviting damage to the sub compressor (141).

In contrast, in the third invention, the control means (202) temporarily halts the sub compressor (141), so that the liquid refrigerant remaining in the second heat exchanger (131) during the second operation flows into the bypass path (150) and is sent to the heat source side circuit (40), bypassing the halted sub compressor (141). Then, the sub compressor (141) is started after the liquid refrigerant is discharged thoroughly from the second heat exchanger (131). Hence, damage to the sub compressor (141) due to sucking of the liquid refrigerant is prevented.

Effects

In the present invention, the second operation is performed during the defrosting operation for defrosting the second heat exchanger (131) while the refrigerant evaporated in the first heat exchanger (111, 121) is compressed in the sub compressor (141) and is supplied to second heat exchanger (131). Accordingly, both the heat that the refrigerant absorbs in the first heat exchanger (111, 121) and the heat provided to the refrigerant in the sub compressor (141) are utilized for melting frost attaching to the second heat exchanger (131). Hence, according to the present invention, a larger amount of heat that can be utilized for defrosting the second heat exchanger (131) is ensured in comparison with that in the conventional apparatuses and the time required for defrosting the second heat exchanger (131) is remarkably reduced.

Moreover, in the present invention, the refrigerant condensed in the second heat exchanger (131) during the defrosting operation is sent back to the first heat exchanger (111, 112) and the refrigerant of which enthalpy is lowered due to heat radiation in the second heat exchanger (131) is utilized for cooling the inside of the refrigerator in the first heat exchanger (111, 121). Thus, cooling ability in the first heat exchanger (111, 121) can be obtained also from the operation of the sub compressor (141) during the defrosting operation and power consumption in the main compressor (41) can be reduced by the thus obtained cooling ability. As a result, according to the present invention, the power consumption by the main compressor (41) and the sub compressor (141) can be reduced, thereby attaining reduction of the power consumption of the refrigerator (10) and lowering of the running cost.

In the second invention, the control means (201) keeps the expansion valve (132) of the second cooling circuit (30) to be opened fully. As such, according to this invention, the refrigerant condensed in the second heat exchanger (131) during the defrosting operation can be sent thoroughly to the first heat exchanger (111, 121).

In the third invention, the control means (202) halts temporarily the sub compressor (141) at termination of the defrosting operation and the liquid refrigerant is discharged from the second heat exchanger (131) through the bypass path (150) during a halted state of the sub compressor (141).

Accordingly, the sub compressor (141) is prevented surely from sucking the liquid refrigerant remaining in the second heat exchanger (131) during the defrosting operation. Hence, according to this invention, damage to the sub compressor (141) due to sucking of the liquid refrigerant can be prevented, with a result of increase in reliability of the refrigerating apparatus (10).

BEST MODE FOR CARRYING OUT THE INVENTION

Embodiments of the present invention will be described in detail hereinafter with reference to accompanying drawings.

Embodiment 1

One embodiment of the present invention will be described below in detail with reference to drawings. A refrigerating apparatus (10) of the present embodiment is installed in a convenience store or the like for performing air conditioning in a shop and cooling the inside of showcases.

Figure 1:
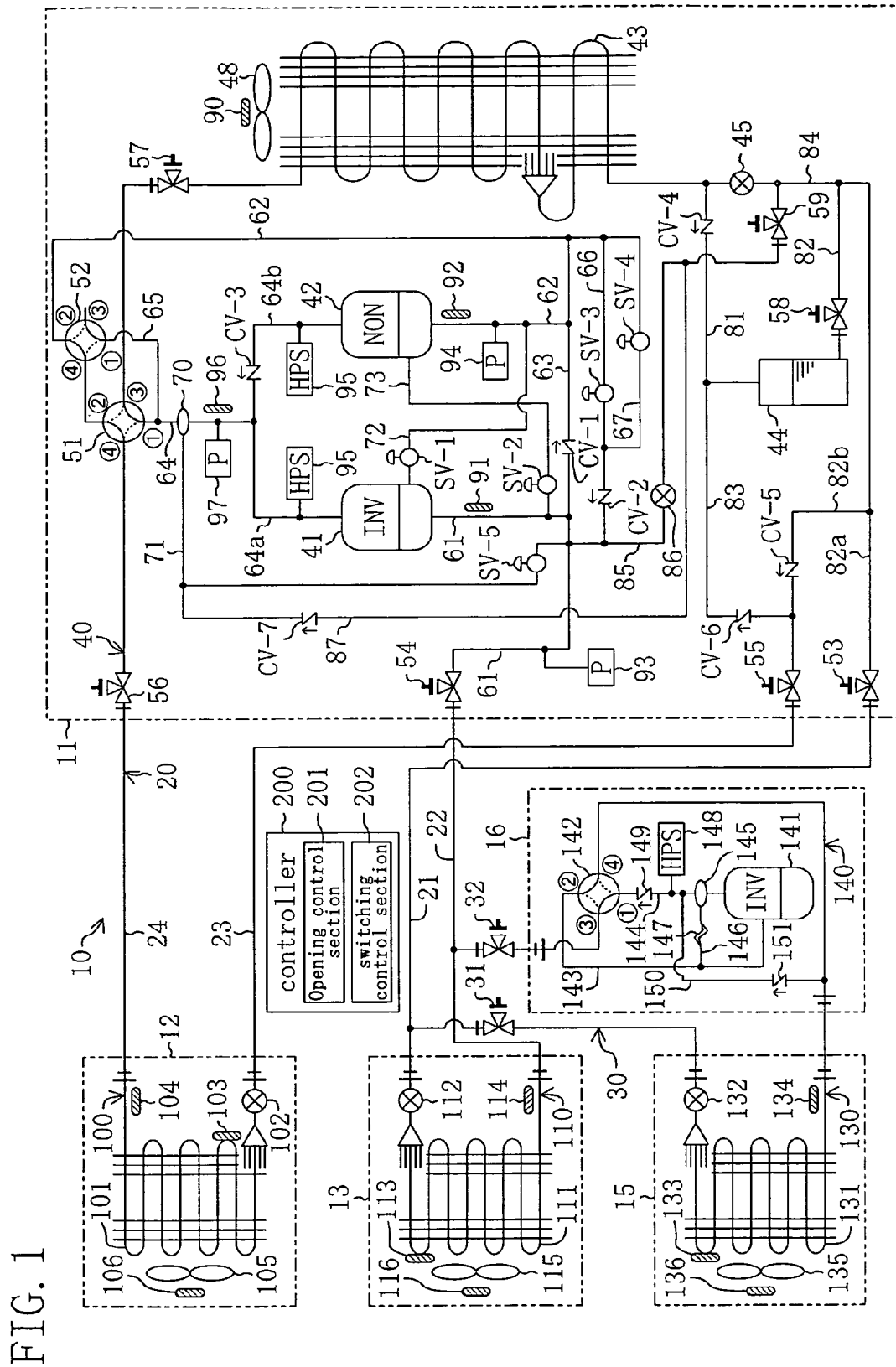
FIG. 1 is a schematic view of a refrigerating apparatus in Embodiment 1.

As shown in FIG. 1, the refrigerating apparatus (10) of the present embodiment is provided with an outdoor unit (11), an air conditioning unit (12), a refrigerator showcase (13) as a refrigerator, a freezer showcase (15) as a freezer, and a booster unit (16). The outdoor unit (11) is placed outdoors. The other components such as the air conditioning unit (12) are installed inside a shop such as a convenience store.

The outdoor unit (11), the air conditioning unit (12), the refrigerator showcase (13), the freezer showcase (15) and the booster unit (16) include an outdoor circuit (40), an air conditioning circuit (100), a refrigerator circuit (110), a freezer circuit (130) and a booster circuit (140), respectively. In the refrigerating apparatus (10), these circuits (40, 100, . . . ) are connected through piping to compose a refrigerant circuit (20).

The freezer circuit (130) and the booster circuit (140) are connected in series to each other so as to compose a freezing circuit (30) serving as a second cooling circuit. The freezing circuit (30) includes a liquid side stop valve (31) at the end thereof on the freezer showcase (15) side and a gas side stop valve (32) at the end thereof on the booster unit (16) side. The refrigerator circuit (110) solely composes a first cooling circuit, and the outdoor unit (40) solely composes a heat source side circuit.

In the refrigerant circuit (20), the refrigerator circuit (110) and the freezing circuit (30) are connected in parallel to the outdoor circuit (40). In detail, the refrigerator circuit (110) and the freezing circuit (30) are connected to the outdoor circuit (40) through a first liquid side communication pipe (21) and a first gas side communicating pipe (22). The first liquid side communication pipe (21) is connected at one end thereof to the outdoor circuit (40). The other end of the first liquid side communication pipe (21) branches into two, one of which is connected to the liquid side end of the refrigerator circuit (110) and the other is connected to the liquid side stop valve (31). The first gas side communication pipe (22) is connected at one end thereof to the outdoor circuit (40). The other end of the first gas side communication pipe (22) branches into two, one of which is connected to the gas side end of the refrigerator circuit (110) and the other is connected to the gas side stop valve (32).

Further, in the refrigerant circuit (20), the air conditioning circuit (100) is connected to the outdoor circuit (40) through a second liquid side communication pipe (23) and a second gas side communication pipe (24). The second liquid side communication pipe (23) is connected at one end thereof to the outdoor circuit (40) and is connected at the other end thereof to the liquid side end of the air conditioning circuit (100). The second gas side communication pipe (24) is connected at one end thereof to the outdoor circuit (40) and is connected at the other end thereof to the gas side end of the air conditioning circuit (100).

Outdoor Unit

As described above, the outdoor unit (11) includes the outdoor circuit (40). This outdoor circuit (40) is provided with a variable capacitance compressor (41), a fixed capacitance compressor (42), an outdoor heat exchanger (43), a receiver (44) and an outdoor expansion valve (45). The outdoor circuit (40) is also provided with two four-way switch valves (51, 52), two liquid side stop valves (53, 55) and two gas side stop valves (54, 56). In the outdoor circuit (40), the first liquid side stop valve (53), the first gas side stop valve (54), the second liquid side stop valve (55) and the second gas side stop valve (55) are connected to the first liquid side communication pipe (21), the first gas side communication pipe (22), the second liquid side communication pipe (23) and the second gas side communication pipe (24), respectively. Both the variable capacitance compressor (41) and the fixed capacitance compressor (42) are hermetic scroll compressors of high-pressure dome type. To the variable capacitance compressor (41), electric power is supplied via an inverter. The capacitance of the variable capacitance compressor (41) is variable in a manner that the output frequency of the inverter is changed to change the rotation speed of the compressor motor. The variable capacitance compressor (41) composes a main compressor. On the other hand, the compressor motor of the fixed capacitance compressor (42) is driven always at a constant rotation speed so that the capacitance of the fixed capacitance compressor (42) is invariable.

The variable capacitance compressor (41) is connected on the intake side thereof to one end of a first intake pipe (61). The other end of the first intake pipe (61) is connected to the first gas side stop valve (54). On the other hand, the fixed capacitance compressor (42) is connected on the intake side thereof to one end of a second intake pipe (62). The other end of the second intake pipe (62) is connected to the second four-way switch valve (52). Further, one end of an intake connection pipe (63) is connected to the first intake pipe (61) and the other end of the intake connection pipe (63) is connected to the second intake pipe (62). In the intake connection pipe (63), a check valve (CV-1) is provided which allows the refrigerant to flow only from one end toward the other end thereof.

To the variable capacitance compressor (41) and the fixed capacitance compressor (42), a discharge pipe (64) is connected. One end of the discharge pipe (64) is connected to the first four-way switch valve (51). The discharge pipe (64) branches at the other end into a first branch pipe (64a) and a second branch pipe (64b). The first branch pipe (64a) of the discharge pipe (64) is connected to the discharge side of the variable capacitance compressor (41) and the second branch pipe (64b) thereof is connected to the discharge side of the fixed capacitance compressor (42). In the second branch pipe (64b) of the discharge pipe (64), a check valve (CV-3) is provided which allows the refrigerant to flow only from the fixed capacitance compressor (42) toward the first four-way switch valve (51). Also, one end of a discharge connection pipe (65) is connected to the discharge pipe (64) and the other end of the discharge connection pipe (65) is connected to the second four-way switch valve (52).

The outdoor heat exchanger (43) is a fin and tube heat exchanger of cross fin type and composes a heat source side heat exchanger. In the outdoor heat exchanger (43), heat exchange is performed between the refrigerant and outdoor air. The outdoor heat exchanger (43) is connected at one end thereof to the first four-way switch valve (51) via a stop valve (57) and is connected at the other end thereof to the top part of the receiver (44) through a first liquid pipe (81). In the first liquid pipe (81), a check valve (CV-4) is provided which allows the refrigerant to flow only from the outdoor heat exchanger (43) toward the receiver (44).

To the bottom of the receiver (44), one end of a second liquid pipe (82) is connected via a stop valve (58). The second liquid pipe (82) branches at the other end thereof into a first branch pipe (82a) and a second branch pipe (82b). The first branch pipe (82a) of the second liquid pipe (82) is connected to the first liquid side blocking pipe (53) and the second branch pipe (82b) thereof is connected to the second liquid side stop valve (55). In the second branch pipe (82b) of the second liquid pipe (82), a check valve (CV-5) is provided which allows the refrigerant to flow only from the receiver (44) toward the second liquid side stop valve (55).

One end of a third liquid pipe (83) is connected to the second branch pipe (82b) of the second liquid pipe (82) between the check valve (CV-5) and the second liquid side stop valve (55). The other end of the third liquid pipe (83) is connected to the top part of the receiver (44). Further, in the third liquid pipe (83), a check valve (CV-6) is provided which allows the refrigerant to flow only from one end toward the other end thereof.

In the second liquid pipe (82), one end of a fourth liquid pipe (84) is connected on the downstream side of the stop valve (58). The other end of the fourth liquid pipe (84) is connected to the first liquid pipe (81) between the outdoor heat exchanger (43) and the check valve (CV-4). Also, an outdoor expansion valve (45) is provided in the fourth liquid pipe (84).

In the first four-way switch valve (51), a first port, a second port, a third port and a fourth port are connected to the discharge pipe (64), the second four-way switch valve (52), the outdoor heat exchanger (43) and the second gas side stop valve (56), respectively. The first four-way switch valve (51) is exchangeable between a first state (state shown by solid lines in FIG. 1) where the first port and the third port communicate with each other and the second port and the fourth port communicate with each other and a second state (state shown by broken lines in FIG. 1) where the first port and the fourth port communicate with each other and the second port and the third port communicate with each other.

In the second four-way switch valve (52), a first port, a second port and a fourth port are connected to the discharge connection pipe (65), the second intake pipe (62) and the first four-way switch valve (51), respectively. Further, a third port of the second four-way switch valve (52) is sealed. The second four-way switch valve (52) is exchangeable between a first state (state shown by solid lines in FIG. 1) where the first port and the third port communicate with each other and the second port and the fourth port communicate with each other and a second state (state shown by broken lines in FIG. 1) where the first port and the fourth port communicate with each other and the second port and the third port communicate with each other.

In the outdoor circuit (40), there are also provided an oil separator (70), an oil return pipe (71), an injection pipe (85) and a communication pipe (87). Further, two oil level equalizing pipes (72, 73) and two intake side pipes (66, 67) are provided in the outdoor circuit (40).

The oil separator (70) is provided to the discharge pipe (64), and serves for separating refrigerating machine oil from the discharge gas of the compressors (41, 42). To the oil separator (70), one end of the oil return pipe (71) is connected. The other end of the oil return pipe (71) is connected to the first intake pipe (61). Further, a solenoid valve (SV-5) is provided in the oil return pipe (71). When the solenoid valve (SV-5) opens, the refrigerating machine oil separated in the oil separator (70) is sent back to the intake side of the variable capacitance compressor (41).

The first oil level equalizing pipe (72) is connected at one end thereof to the variable capacitance compressor (41) and is connected at the other end thereof to the second intake pipe (62). In the first oil level equalizing pipe (72), a solenoid valve (SV-1) is provided. On the other hand, the second oil level equalizing pipe (73) is connected at one end thereof to the fixed capacitance compressor (42) and is connected at the other end thereof to the first intake pipe (61). In the second oil level equalizing pipe (73), a solenoid valve (SV-2) is provided. These solenoid valves (SV-1, SV-2) adequately opens or closes, thereby equalizing the storage amounts of the refrigerating machine oil in the respective compressors (41, 42). The first intake side pipe (66) is connected at one end thereof to the second intake pipe (62) and is connected at the other end thereof to the first intake pipe (61). In the first intake side pipe (66), a solenoid valve (SV-3) and a check valve (CV-2) are provided in this order from one end toward the other end thereof. The check valve (CV-2) allows the refrigerant to flow only from one end toward the other end of the first intake side pipe (66). On the other hand, the second intake side pipe (67) is arranged so as to connect both sides of the solenoid valve (SV-3) of the first intake side pipe (66). In the second intake side pipe (67), a solenoid valve (SV-4) is provided.

The injection pipe (85) serves for performing so-called liquid injection, and is connected at one end thereof to the fourth liquid pipe (84) via the stop valve (59) and is connected at the other end thereof to the first intake pipe (61). In the injection pipe (85), a flow amount adjusting valve (86) of which opening is variable is provided. Between the stop valve (59) and the flow amount adjusting valve (86)

in the injection pipe (85), one end of a communication pipe (87) is connected. The other end of the communication pipe (87) is connected to the oil return pipe (87) between the oil separator (70) and the solenoid valve (SV-5). In the communication pipe (87), a check valve (CV-7) is provided which allows the refrigerant to flow only from one end toward the other end thereof.

In the outdoor circuit (40), various kinds of sensors and pressure switches are provided. Specifically, a first intake temperature sensor (91) and a first intake pressure sensor (93) are provided for the first intake pipe (61). A second intake temperature sensor (92) and a second intake pressure sensor (94) are provided for the second intake pipe (62). A discharge temperature sensor (96) and a discharge pressure sensor (97) are provided for the discharge pipe (64). For each of the branch pipes (64*a*, 64*b*) of the discharge pipe (64), one high-pressure switch (95) is provided.

Further, an outdoor air temperature sensor (90) and an outdoor fan (48) are provided for the outdoor unit (11). The outdoor fan (48) sends outdoor air to the outdoor heat exchanger (43).

Air Conditioning Unit

As described above, the air conditioning unit (12) is provided with the air conditioning circuit (100). In the air conditioning circuit (100), there are provided an air conditioner expansion valve (102) and an air conditioner heat exchanger (101) in this order from the liquid side end toward the gas side end thereof. The air conditioner heat exchanger (101) is a fin and tube heat exchanger of cross fin type and performs heat exchange between the refrigerant and room air. The air conditioner expansion valve (102) is an electronic expansion valve.

A heat exchanger temperature sensor (103) and a refrigerant temperature sensor (104) are provided for the air conditioning unit (12). The heat exchanger temperature sensor (103) is mounted to the heat transfer tube of the air conditioner heat exchanger (101). The refrigerant temperature sensor (104) is mounted in the vicinity on the gas side end of the air conditioning circuit (100). Further, an inner temperature sensor (106) and an air conditioning fan (105) are provided for the air conditioning unit (12). The air conditioning fan (105) sends room air in the shop to the air conditioner heat exchanger (101).

Refrigerator Showcase

As described above, the refrigerator showcase (13) is provided with the refrigerator circuit (110). In the refrigerator circuit (110), there are provided a refrigerator expansion valve (112) and a refrigerator heat exchanger (111) in this order from the liquid side end toward the gas side end thereof. The refrigerator heat exchanger (111) is a fin and tube heat exchanger of cross fin type and composes a first heat exchanger. The refrigerator heat exchanger (111) performs heat exchange between the refrigerant and air inside the refrigerator. On the other hand, the refrigerator expansion valve (112) is an electronic expansion valve.

A heat exchanger temperature sensor (113) and a refrigerant temperature sensor (114) are provided for the refrigerator showcase (13). The heat exchanger temperature sensor (113) is mounted to the heat transfer tube of the refrigerator heat exchanger (111). The refrigerant temperature sensor (114) is mounted in the vicinity of the gas side end of the refrigerator circuit (110). Further, a refrigerator temperature sensor (116) and a refrigerator fan (115) are provided for the refrigerator showcase (13). The refrigerator fan (115) sends air inside the refrigerator showcase (13) to the refrigerator heat exchanger (111).

Freezer Showcase

As described above, the freezer showcase (15) is provided with the freezer circuit (130). In the freezer circuit (130), there are provided a freezer expansion valve (132) and a freezer heat exchanger (131) in this order from the liquid side end toward the gas side end thereof. The freezer heat exchanger (131) is a fin and tube heat exchanger of cross fin type and composes a second heat exchanger. The freezer heat exchanger (131) performs heat exchange between the refrigerant and air inside the freezer. On the other hand, the freezer expansion valve (132) is an electronic expansion valve. The freezer expansion valve (132) is an expansion valve of which opening is variable provided in the freezing circuit (30). A heat exchanger temperature sensor (133) and a refrigerant temperature sensor (134) are provided for the freezer showcase (15). The heat exchanger temperature sensor (133) is mounted to the heat transfer tube of the freezer heat exchanger (131). The refrigerant temperature sensor (134) is mounted in the vicinity of the gas side end of the freezer circuit (130). Further, a freezer temperature sensor (136) and a freezer fan (135) are provided for the freezer showcase (15). The freezer fan (135) sends air inside the freezer showcase (15) to the freezer heat exchanger (131).

Booster Unit

As described above, the booster unit (16) is provided with the booster circuit (140). In the booster circuit (140), there are provided a booster compressor (141), a four-way switch valve (142) and a bypass path (150).

The booster compressor (141) is a hermetic scroll compressor of high-pressure dome type. To the booster compressor (141), electric power is supplied via an inverter. The capacitance of the booster compressor (141) is variable in a manner that an output frequency of the inverter is changed to change the rotation speed of the compressor motor. The booster compressor (141) composes a sub compressor.

The booster compressor (141) is connected at an intake side thereof to one end of an intake pipe (143) and is connected at a discharge side thereof to one end of a discharge pipe (144). The intake pipe (143) and the discharge pipe (144) are connected at the respective other ends thereof to a four-way switch valve (142).

The four-way switch valve (142) is connected at a first port thereof to the discharge pipe (144) and is connected at a second port thereof to the intake pipe (143). Also, the four-way switch valve (142) is connected at a third port thereof to the gas side stop valve (32) through piping and is connected at a forth port thereof to the gas side end of the freezer circuit (130) through piping. The four-way switch valve (142) is exchangeable between a first state (state indicated by solid lines in FIG. 1) where the first port and the third port communicate with each other and the second port and the fourth port communicate with each other and a second state (state indicated by broken lines in FIG. 1) where the first port and the fourth port communicate with each other and the second port and the third port communicate with each other.

The four-way switch valve (142) composes a switching mechanism for alternative exchange between a first operation and a second operation in the refrigerant circuit (20). The first operation where the booster compressor (141) sucks the refrigerant from the freezer heat exchanger (131) and discharges it to the sucking side of the variable capacitance compressor (41) is performed under a condition where the four-way switch valve (142) is set to the first state. In contrast, the second operation that the booster compressor (141) sucks the refrigerant from the refrigerator heat exchanger (111) and discharges it to the freezer heat exchanger (131) is performed under a condition that the four-way switch valve (142) is set to the second state.

To the discharge pipe (144), an oil separator (145), a high pressure switch (148) and a discharge side check valve (149) are provided in this order from the booster compressor (141) toward the four-way switch valve (142). The discharge side check valve (149) allows the refrigerant to flow only from the booster compressor (141) toward the four-way switch valve (142).

The oil separator (145) separates refrigerating machine oil from the discharged gas of the booster compressor (141). The oil separator (145) is connected to one end of an oil return pipe (146). The other end of the oil return pipe (146) is connected to the intake pipe (143). The oil return pipe (146) includes a capillary tube (147). The refrigerating machine oil separated in the oil separator (145) is sent back to the sucking side of the booster compressor (141) through the oil return pipe (146).

One end of the bypass path (150) is connected to a pipe which connects the four-way switch valve (142) and the freezer circuit (130). The other end of the bypass path (150) is connected to the discharge pipe (144) between the oil separator (145) and the discharge side check valve (149). Further, in the bypass path (150), a bypass check valve (151) is provided which allows the refrigerant to flow only from one end toward the other end thereof. The bypass path (150) composes a bypass path through which the refrigerant flows only during a halted state of the booster compressor (141), bypassing the booster compressor (141).

Constitution of Controller

The refrigerating apparatus (10) of the present embodiment is provided with a controller (200). The controller (200) is provided with an opening control section (201) and a switching control section (202). The opening control section (201) composes control means for controlling the opening of the freezer expansion valve (132). On the other hand, the switching control section (202) composes control means for performing control operation for the booster compressor (141) at exchange from the second operation to the first operation in the refrigerant circuit (20).

Driving Operation

The main operations will be described out of driving operations that the refrigerating apparatus (10) performs.

Cooling Operation

In cooling operation, air inside the refrigerator showcase (13) and the freezer showcase (15) is cooled and the air conditioning unit (12) cools room air to cool the inside of the shop.

Figure 2:
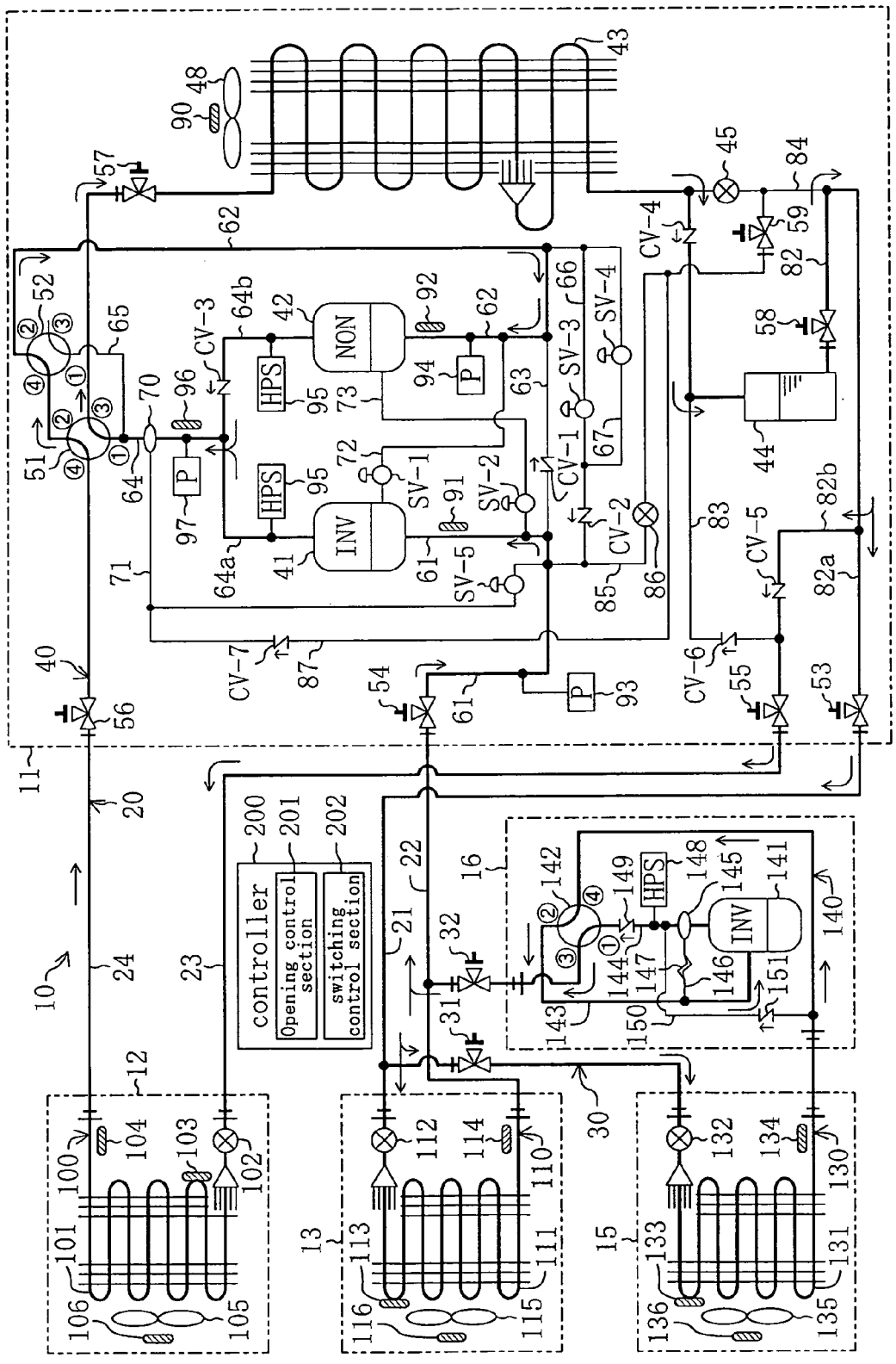
FIG. 2 is a schematic view showing a refrigerant flow during cooling operation of the refrigerating apparatus in Embodiment 1.

As shown in FIG. 2, the first four-way switch valve (51) and the second four-way switch valve (52) are set to the first state in the outdoor circuit (40). The four-way switch valve (142) is set to the first state in the booster circuit (140). Further, the outdoor expansion valve (45) is closed and each opening of the air conditioner expansion valve (102), the refrigerator expansion valve (112) and the freezer expansion valve (132) is adjusted appropriately. Under this condition, the variable capacitance compressor (41), the fixed capacitance compressor (42) and the booster compressor (141) are driven. Since the four-way switch valve (142) of the booster circuit (140) is set to the first state, the refrigerant circuit (20) performs the first operation.

The refrigerant discharged from the variable capacitance compressor (41) and the fixed capacitance compressor (42) is sent to the outdoor heat exchanger (43) through the discharge pipe (64) via the first four-way switch valve (51). In the outdoor heat exchanger (43), the refrigerant radiates heat outdoors to be condensed. The refrigerant condensed in the outdoor heat exchanger (43) flows into the second liquid pipe (82) via the receiver (44) and is distributed into the respective branch pipes (82a, 82b) of the second liquid pipe (82).

The refrigerant that flows into the first branch pipe (82a) of the second liquid pipe (82) is distributed through the first liquid side communication pipe (21) into the refrigerator circuit (110) and the freezer circuit (130).

The refrigerant that flows into the refrigerator circuit (110) is reduced in pressure when passing the refrigerator expansion valve (112), and then, is introduced into the refrigerator heat exchanger (111). In the refrigerator heat exchanger (111), the refrigerant absorbs heat of air inside the refrigerator to be evaporated. At that time, the evaporation temperature of the refrigerant is set to, for example, about −5° C. in the refrigerator heat exchanger (111). The refrigerant evaporated in the refrigerator heat exchanger (111) flows into the first gas side communication pipe (22). In the refrigerator showcase (13), the air inside the refrigerator cooled in the refrigerator heat exchanger (111) is supplied to the inside of the refrigerator, so that the temperature inside the refrigerator is kept at, for example, about 5° C.

The refrigerant that flows into the freezer circuit (130) is reduced in pressure when passing the freezer expansion valve (132), and then, is introduced into the freezer heat exchanger (131). In the freezer heat exchanger (131), the refrigerant absorbs heat of air inside the freezer to be evaporated. At that time, the evaporation temperature of the refrigerant is set to, for example, −30° C. in the freezer heat exchanger (131). The air inside the freezer cooled in the freezer heat exchanger (131) is supplied to the freezer showcase (15), so that the temperature inside the freezer is kept at, for example, about −20° C.

The refrigerant evaporated in the freezer heat exchanger (131) flows into the booster circuit (140) and is sucked into the booster compressor (141) via the four-way switch valve (142). The refrigerant compressed in the booster compressor (141) flows into the first gas side communication pipe (22) through the discharge pipe (144) via the four-way switch valve (142).

In the first gas side communication pipe (22), the refrigerant sent from the refrigerator circuit (110) and the refrigerant sent from the booster circuit (140) are joined. Then, the thus joined refrigerant flows from the first gas side communication pipe (22) toward the first intake pipe (61), and is sucked into the variable capacitance compressor (41). The variable capacitance compressor (41) compresses the thus sucked refrigerant and discharges it to the first branch pipe (64a) of the discharge pipe (64).

On the other hand, the refrigerant that flows into the second branch pipe (82b) of the second liquid pipe (82) is supplied to the air conditioning circuit (100) through the second liquid side communication pipe (23). The refrigerant that flows into the air conditioning circuit (100) is reduced in pressure when passing the air conditioner expansion valve (102), and then, is introduced into the air conditioner heat exchanger (101). In the air conditioner heat exchanger (101), the refrigerant absorbs heat from room air to be evaporated. In the air conditioning unit (12), the room air cooled in the air conditioner heat exchanger (101) is supplied to the shop. The refrigerant evaporated in the air conditioner heat exchanger (101) flows into the outdoor circuit (40) via the second four-way switch valve (52), passes through the first four-way switch valve (51) and the second four-way switch valve (52) in this order, and then, is sucked into the fixed capacitance compressor (42) through the second intake pipe (62). The fixed capacitance compressor (42) compresses the thus sucked refrigerant and discharges it to the second branch pipe (64b) of the second discharge pipe (64).

First Heating Operation

In a first heating operation, inside air is cooled in the refrigerator showcase (13) and the freezer showcase (15) and the air conditioning unit (12) heats room air to heat the inside of the shop.

Figure 3:
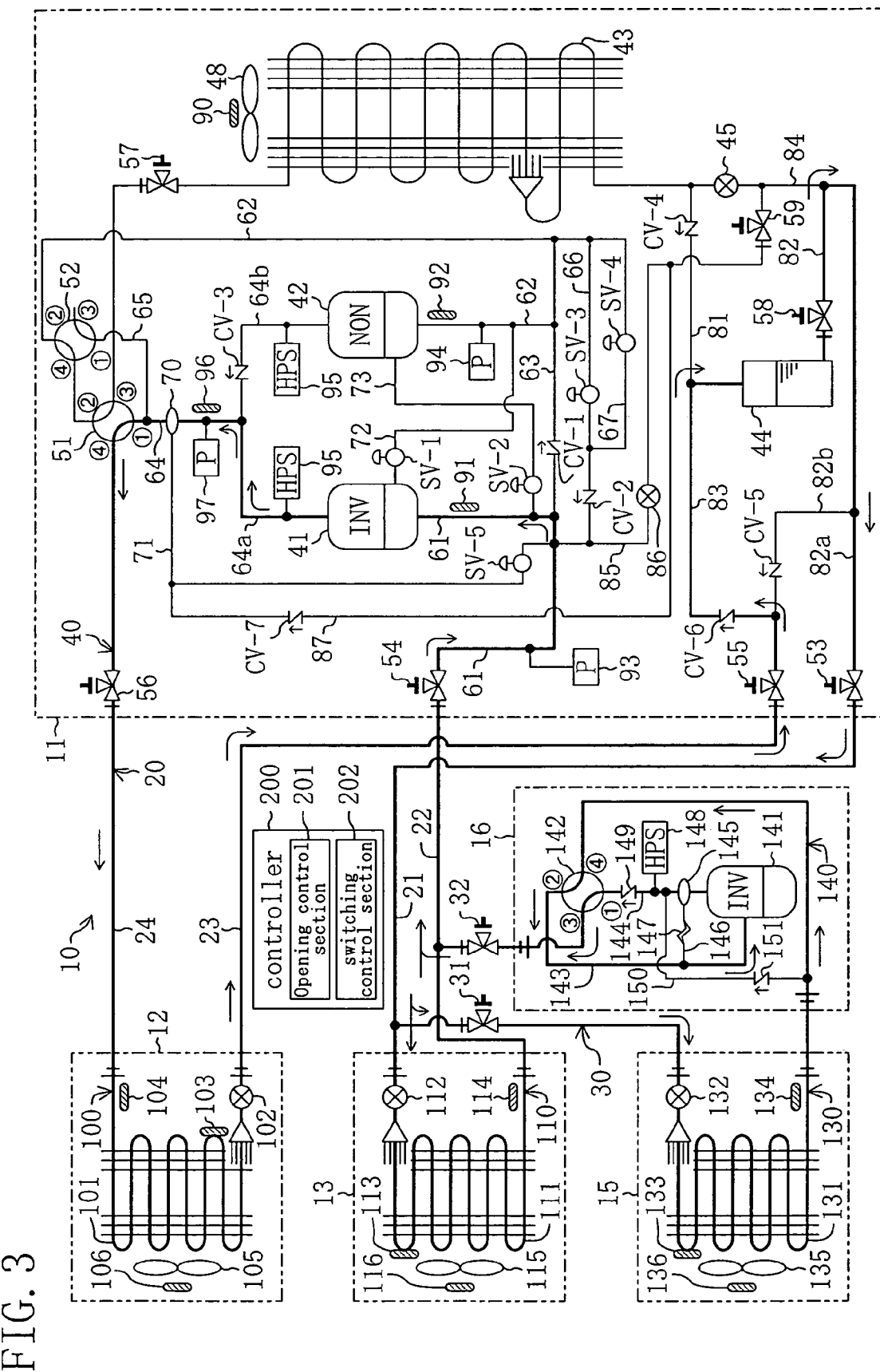
FIG. 3 is a schematic view showing a refrigerant flow during a first heating operation of the refrigerating apparatus in Embodiment 1.

As shown in FIG. 3, in the outdoor circuit (40), the first four-way switch valve (51) and the second four-way switch valve (52) are set to the second state and the first state, respectively. In the booster circuit (140), the four-way switch valve (142) is set to the first state. Further, the outdoor expansion valve (45) is closed and each opening of the air conditioner expansion valve (102), the refrigerator expansion valve (112) and the freezer expansion valve (132) is adjusted appropriately. Under this condition, the variable capacitance compressor (41) and the booster compressor (141) are driven and the fixed capacitance compressor (42) is halted. Also, the outdoor heat exchanger (43) is in the halted state without the refrigerant to be sent. Since the four-way switch valve (142) of the booster circuit (140) is set to the first state, the refrigerant circuit (20) performs the first operation.

The refrigerant discharged from the variable capacitance compressor (41) is introduced into the air conditioner heat exchanger (101) of the air conditioning circuit (100) through the second gas side communication pipe (24), and then, radiates heat outdoors to be condensed. In the air conditioning unit (12), the room air heated in the air conditioner heat exchanger (101) is supplied to the shop. The refrigerant condensed in the air conditioner heat exchanger (101) is sent back to the outdoor circuit (40) through the second liquid side communication pipe (23), and then, flows into the second liquid pipe (82) via the receiver (44).

The refrigerant that flows into the second liquid pipe (82) is distributed through the first liquid side communication pipe (21) into the refrigerator circuit (110) and the freezer circuit (130). In the refrigerator showcase (13) and the freezer showcase (15), inside air is cooled as in the above cooling operation. The refrigerant evaporated in the refrigerator heat exchanger (111) flows into the first intake pipe (61) through the first gas side communication pipe (22). On the other hand, the refrigerant evaporated in the freezer heat exchanger (131) is compressed in the booster compressor (141), and then, flows into the first intake pipe (61) through the first gas side communication pipe (22). The refrigerant that flows into the first intake pipe (61) is sucked into the variable capacitance compressor (41) to be compressed.

In this way, in the first heating operation, the refrigerant absorbs heat in the refrigerator heat exchanger (111) and the freezer heat exchanger (131) and the refrigerant radiates heat in the air conditioner heat exchanger (101). Then, the shop is heated by utilizing the heat that the refrigerant absorbs from the inside air in the refrigerator heat exchanger (111) and the freezer heat exchanger (131).

It should be noted that the fixed capacitance compressor (42) may be driven in the first heating operation. Whether to drive the fixed capacitance compressor (42) depends on cooling loads in the refrigerator showcase (13) and the freezer showcase (15). In this case, part of the refrigerant that flows into the first intake pipe (61) is sucked into the fixed capacitance compressor (42) through the intake connection pipe (63) and the second intake pipe (62).

Second Heating Operation

In second operation, the inside of the shop is heated as in the first heating operation. The second heating operation is performed in the case where the heating ability is excessive in the first heating operation.

Figure 4:
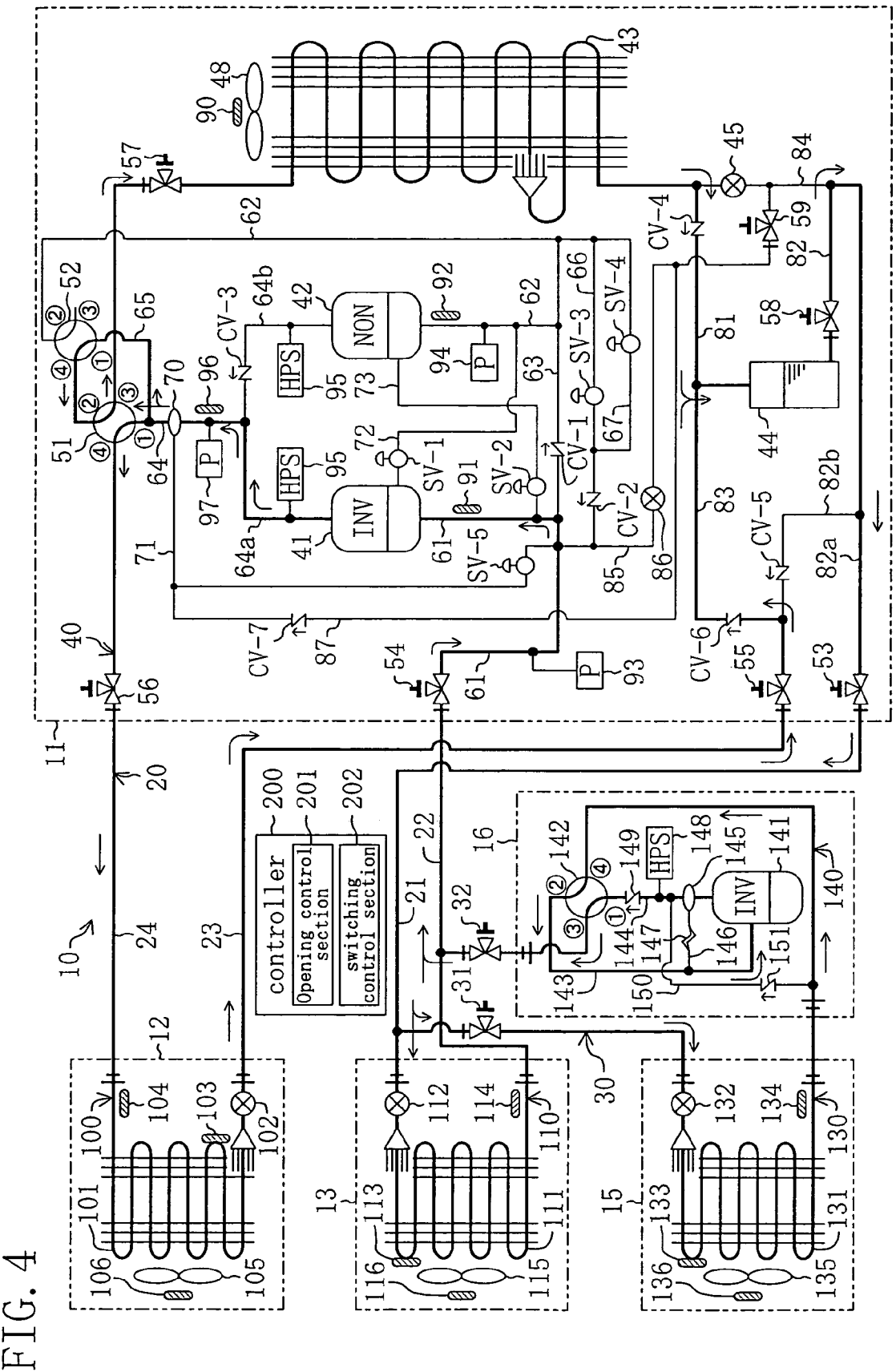
FIG. 4 is a schematic view showing a refrigerant flow during a second heating operation of the refrigerating apparatus in Embodiment 1.

As shown in FIG. 4, the first four-way switch valve (51) and the second four-way switch valve (52) are set to the second state in the outdoor circuit (40). The four-way switch valve (142) is set to the first state in the booster circuit (140). Further, the outdoor expansion valve (45) is closed and each opening of the air conditioner expansion valve (102), the refrigerator expansion valve (112) and the freezer expansion valve (132) is adjusted appropriately. Under this condition, the variable capacitance compressor (41) and the booster compressor (141) are driven and the fixed capacitance compressor (42) is halted. Since the four-way switch valve (142) of the booster circuit (20) is set to the first state, the refrigerant circuit (20) performs the first operation.

Part of the refrigerant discharged from the variable capacitance compressor (41) is introduced into the air conditioner heat exchanger (101) of the air conditioning circuit (100) through the second gas side communication pipe (24) and the other part of the refrigerant is introduced into the outdoor heat exchanger (43) through the discharge connection pipe (65). The refrigerant introduced into the air conditioner heat exchanger (101) radiates heat to room air to be condensed, and then, flows into the receiver (44) through the second liquid side communication pipe (23) and the third liquid pipe (83) of the outdoor circuit (40). The refrigerant introduced into the outdoor heat exchanger (43) radiates heat outdoors to be condensed, and then, flows into the receiver (44) through the first liquid pipe (81).

The refrigerant that flows from the receiver (44) into the second liquid pipe (82) is distributed through the first liquid side communication pipe (21) into the refrigerator circuit (110) and the freezer circuit (130), as in the first heating operation. In the refrigerator showcase (13) and the freezer showcase (15), the inside air is cooled. The refrigerant evaporated in the refrigerator heat exchanger (111) flows into the first intake pipe (61) through the first gas side communication pipe (22). On the other hand, the refrigerant evaporated in the freezer heat exchanger (131) is compressed in the booster compressor (141), and then, flows into the first intake pipe (61) through the first gas side communication pipe (22). The refrigerant that flows into the first intake pipe (61) is sucked into the variable capacitance compressor (41) to be compressed.

In this way, in the second heating operation, the refrigerant absorbs heat in the refrigerator heat exchanger (111) and the freezer heat exchanger (131) and the refrigerant radiates heat in the air conditioner heat exchanger (101) and the outdoor heat exchanger (43). Further, the heat that the refrigerant absorbs from the inside air in the refrigerator heat exchanger (111) and the freezer heat exchanger (131) is utilized in part for heating the inside of the shop and is discharged in the other part outdoors.

It should be noted that the fixed capacitance compressor (42) may be driven in the second heating operation. Whether to drive the fixed capacitance compressor (42) depends on cooling loads in the refrigerator showcase (13) and the freezer showcase (15). In this case, part of the refrigerant that flows into the first intake pipe (61) is sucked into the fixed capacitance compressor (42) through the intake connection pipe (63) and the second intake pipe (62).

Third Heating Operation

In a third heating operation, inside of the shop is heated as in the first heating operation. The third heating operation is performed in the case where the heating ability is insufficient in the first heating operation.

Figure 5:
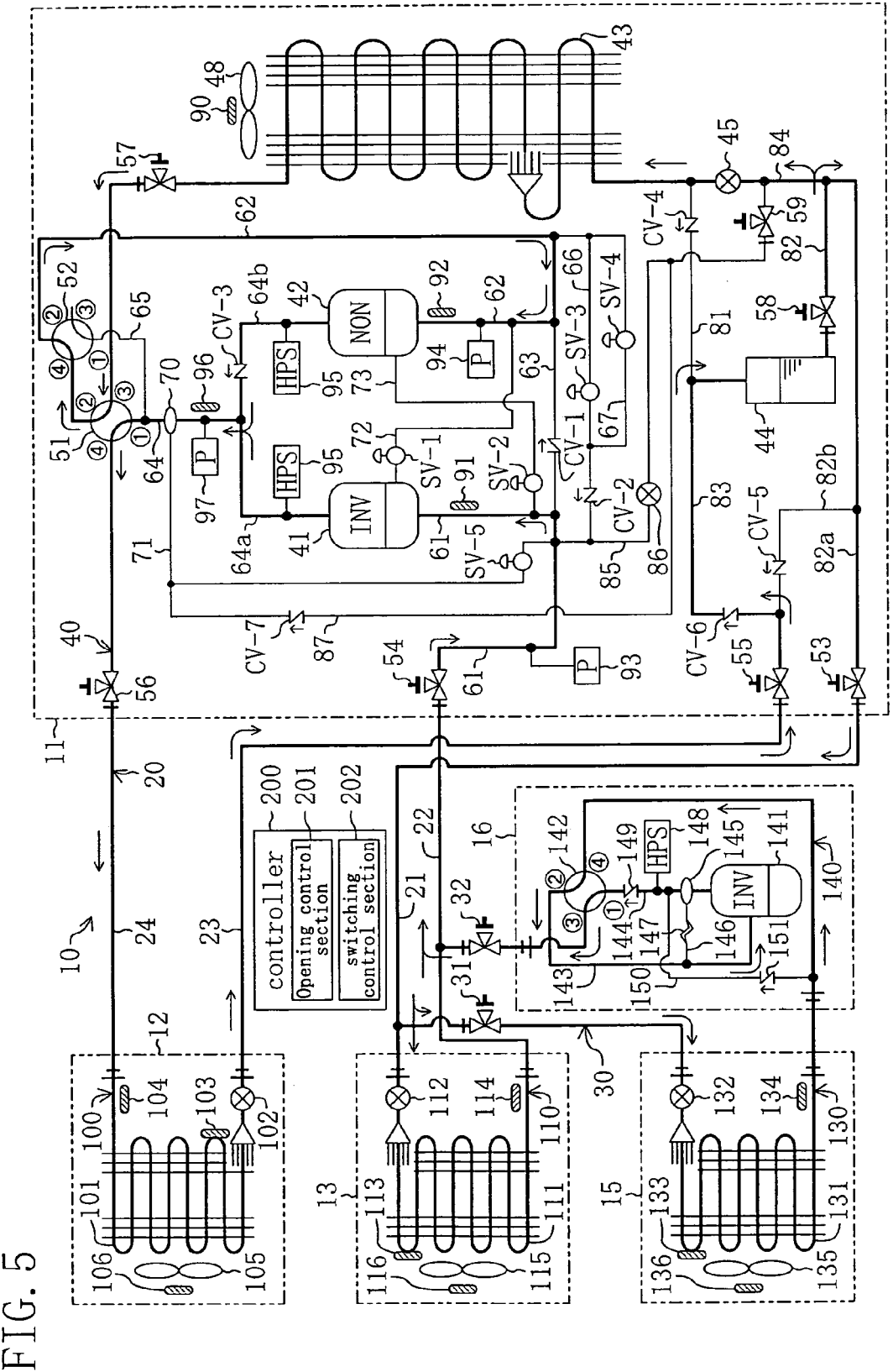
FIG. 5 is a schematic view showing a refrigerant flow during a third heating operation of the refrigerating apparatus in Embodiment 1.

As shown in FIG. 5, in the outdoor circuit (40), the first four-way switch valve (51) and the second four-way switch valve (52) are set to the second state and the first state, respectively. The four-way switch valve (142) is set to the first state in the booster circuit (140). Further, each opening of the outdoor expansion valve (45), the air conditioner expansion valve (102), the refrigerator expansion valve (112) and the freezer expansion valve (132) is adjusted appropriately. Under this condition, the variable capacitance compressor (41), the fixed capacitance compressor (42) and the booster compressor (141) are driven. Since the four-way switch valve (142) of the booster circuit (140) is set to the first state, the refrigerant circuit (20) performs the first operation.

The refrigerant discharged from the variable capacitance compressor (41) and the fixed capacitance compressor (42) is introduced into the air conditioner heat exchanger (101) of the air conditioning circuit (100) through the second gas side communication pipe (24), and then, radiates heat outdoors to be condensed. In the air conditioning unit (12), the inside air heated in the air conditioner heat exchanger (101) is supplied to the inside of the shop. The refrigerant condensed in the air conditioner heat exchanger (101) flows into the receiver (44) through the second liquid side communication pipe (23) and the third liquid pipe (83). Part of the refrigerant that flows from the receiver (44) into the second liquid pipe (82) flows into the first liquid side communication pipe (21) and the other part thereof flows into the fourth liquid pipe (84).

The refrigerant that flows into the first liquid side communication pipe (21) is distributed into the refrigerator circuit (110) and the freezer circuit (130). In the refrigerator showcase (13) and the freezer show case (15), inside air is cooled as in the first heating operation. The refrigerant evaporated in the refrigerator heat exchanger (111) flows into the first intake pipe (61) through the first gas side communication pipe (22). On the other hand, the refrigerant evaporated in the freezer heat exchanger (131) is compressed in the booster compressor (141), and then, flows into the first intake pipe (61) through the first gas side communication pipe (22). The refrigerant that flows into the first intake pipe (61) is sucked into the variable capacitance compressor (41) to be compressed.

On the other hand, the refrigerant that flows into the fourth liquid pipe (84) is reduced in pressure when passing the outdoor expansion valve (45), is introduced into the outdoor heat exchanger (43), and then, absorbs heat from outdoor air to be evaporated. The refrigerant evaporated in the outdoor heat exchanger (43) flows into the second intake pipe (62), and the then, is sucked into the fixed capacitance compressor (42) to be compressed.

In this way, in the third heating operation, the refrigerant absorbs heat in the refrigerator heat exchanger (111), the freezer heat exchanger (131) and the outdoor heat exchanger (43) and the refrigerant radiates heat in the air conditioner heat exchanger (101). Then, the shop is heated by utilizing the heat that the refrigerant absorbs from the inside air in the refrigerator heat exchanger (111) and the freezer heat exchanger (131) and the heat that the refrigerant absorbs from outdoor air in the outdoor heat exchanger (43).

Defrosting Operation

The refrigerating apparatus (10) performs defrosting operation. The defrosting operation is performed for melting frost attaching to the freezer heat exchanger (131) of the freezer showcase (15).

When air inside the freezer is cooled in the freezer heat exchanger (131), moisture in the inside air becomes frost and attaches to the freezer heat exchanger (131). When the amount of the frost attaching to the freezer heat exchanger (131) is considerable, the flow rate of the inside air passing through the freezer heat exchanger (131) is decreased, with a result of insufficient cooling of the inside air. Therefore, the refrigerating apparatus (10) performs the defrosting operation at given time intervals, for example.

The defrosting operation is performed during the cooling operation or any of the heating operations described above. In other words, defrosting of the freezer heat exchanger (131) is performed in parallel to cooling of inside air in the refrigerator showcase (13). Herein, different features of the defrosting operation from the cooling operation and the respective heating operations will be described in the operation of the refrigerating apparatus (10).

Figure 6:
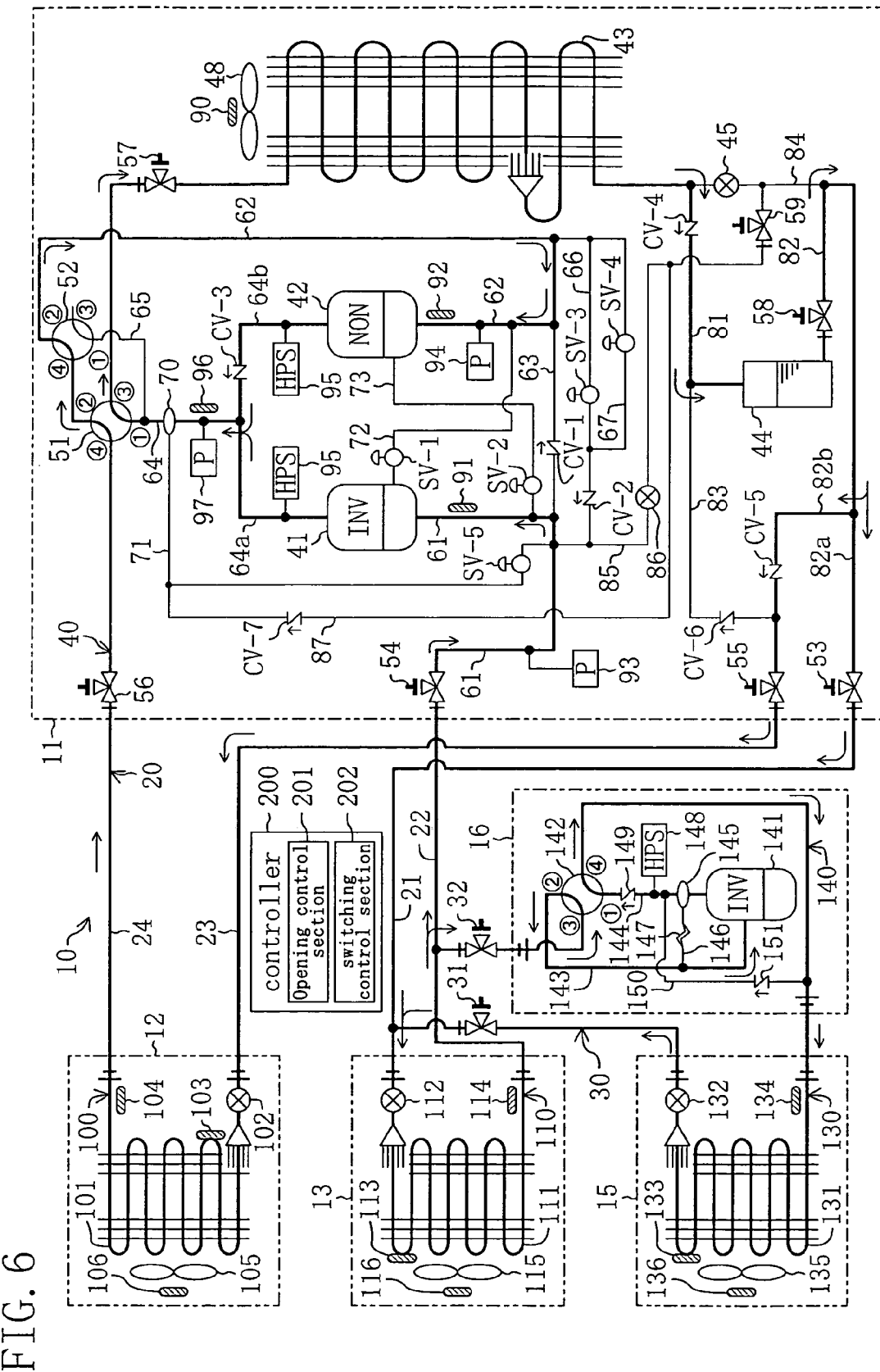
FIG. 6 is a schematic view showing a refrigerant flow during defrosting operation of the refrigerating apparatus in Embodiment 1.

As shown in FIG. 6, the four-way switch valve (142) is set to the second state in the booster circuit (40). It is noted that FIG. 6 shows the refrigerant flow when the defrosting operation is performed during the cooling operation. The four-way switch valve (142) is operated while the booster compressor (141) is being driven. Also, the opening control section (201) of the controller (200) keeps the freezer expansion valve (132) to be opened fully during the defrosting operation. Since the four-way switch valve (142) of the booster circuit (140) is set to the second state, the refrigerant circuit (20) performs the second operation.

Part of the refrigerant that flows into the first gas side communication pipe (22), namely, part of the refrigerant evaporated in the refrigerator heat exchanger (111) is latched into the booster circuit (140). The refrigerant latched in the booster circuit (140) flows into the intake pipe (143), and then, is sucked into the booster compressor (141) to be compressed. The refrigerant discharged from the booster compressor (141) into the discharge pipe (144) is supplied to the freezer heat exchanger (131) of the freezer circuit (130). The thus supplied refrigerant radiates heat to be condensed in the freezer heat exchanger (131). Frost attaching to the freezer heat exchanger (131) is heated and melted by the heat of condensation of the refrigerant.

The refrigerant condensed in the freezer heat exchanger (131) flows into the first liquid side communication pipe (21) via the freezer expansion valve (132), which is opened fully. The refrigerant that flows from the freezer circuit (130) into the first liquid side communication pipe (21) is supplied into the refrigerator circuit (110) together with the refrigerant sent out from the outdoor circuit (40), and then, is sent back to the refrigerator heat exchanger (111) via the refrigerator expansion valve (112).

In this way, in the defrosting operation of the refrigerating apparatus (10), the refrigerant that absorbs heat from inside air in the refrigerator heat exchanger (111) is sucked into the booster compressor (141) and the refrigerant compressed in the booster compressor (141) is sent to the freezer heat exchanger (131). Accordingly, not only the heat provided in the booster compressor (141) but also the heat that the refrigerant absorbs from the inside air in the refrigerator showcase (13) are utilized for melting frost attaching to the freezer heat exchanger (131) in this defrosting operation.

Moreover, in the defrosting operation, the freezer expansion valve (132) is kept to be opened fully so as to send the refrigerant condensed in the freezer heat exchanger (131) to the refrigerator heat exchanger (111). Accordingly, in the defrosting operation, the refrigerant of which enthalpy is lowered by heat radiation in the freezer heat exchanger (131) is supplied to the freezer heat exchanger (111), whereby the refrigerant that has been utilized for defrosting the freezer heat exchanger (131) is utilized again for cooling inside air in the refrigerator showcase (13).

As described above, during the defrosting operation, the refrigerant supplied from the booster compressor (141) is condensed in the freezer heat exchanger (131) and the thus condensed refrigerant is sent out to the first liquid side communication pipe (21). However, the refrigerant condensed in the freezer heat exchanger (131) is not thoroughly sent out to the refrigerator heat exchanger (111) and part of the refrigerant remains in the freezer heat exchanger (131). For this reason, mere exchange of the four-way switch valve (142) from the second state to the first state allows the booster compressor (141) to suck the liquid refrigerant remaining in the freezer heat exchanger (131), thereby inviting damage to the booster compressor (141).

Figure 7:
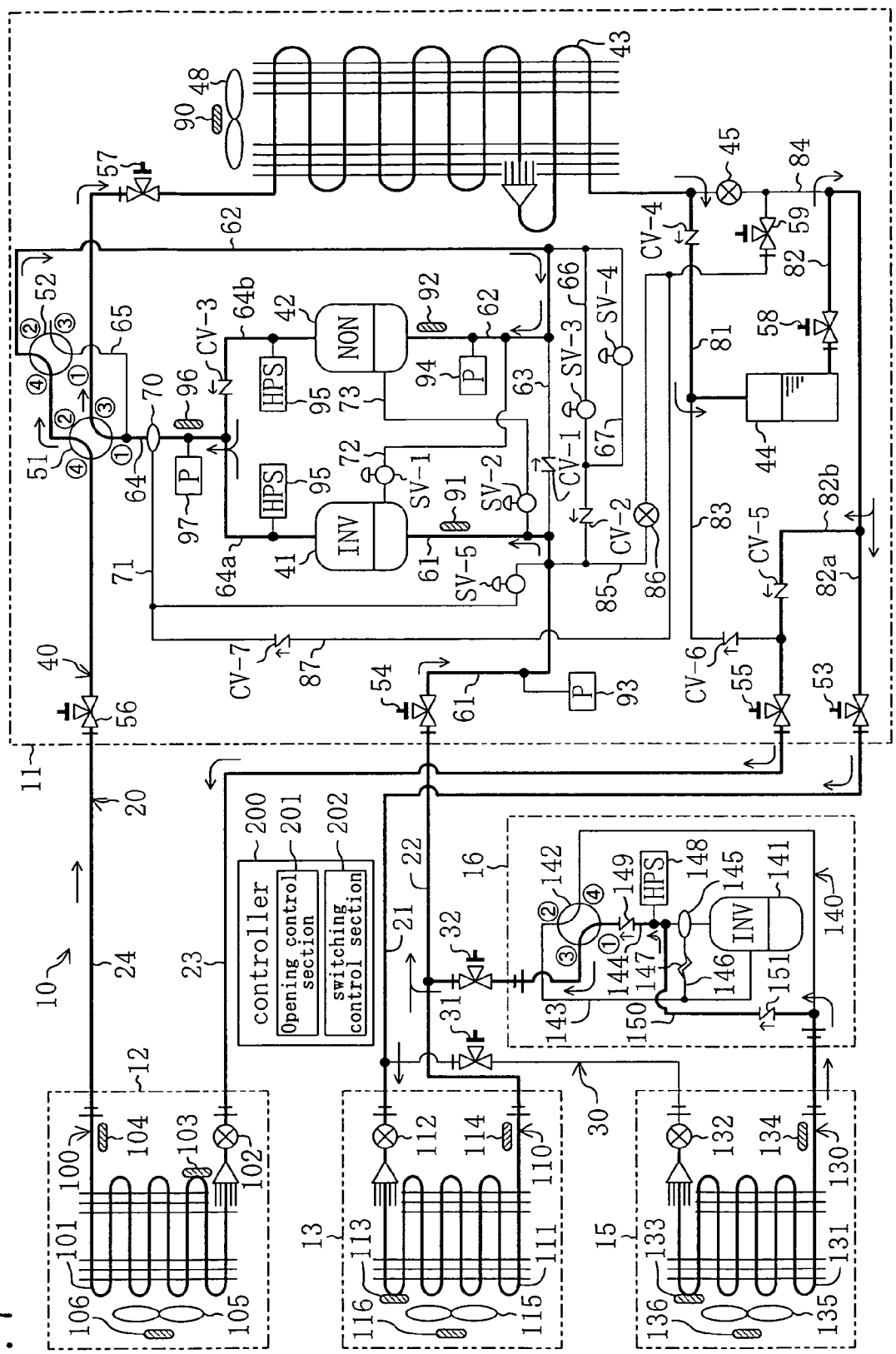
FIG. 7 is a schematic view showing a refrigerant flow at termination of the defrosting operation of the refrigerating apparatus in Embodiment 1.

As such, the switching control section (202) of the controller (100) performs a predetermined control operation at termination of the defrosting operation in the refrigerating apparatus (10) so as to prevent damage to the booster compressor (141). The control operation of the switching control section (202) will be described with reference to FIG. 7. Wherein, FIG. 7 shows the refrigerant flow at termination of the defrosting operation during the cooling operation.

When condition for defrosting operation termination meets, the switching control section (202) exchange the four-way switch valve (142) from the second state (state shown in FIG. 6) to the first state (state shown in FIG. 7) and halts the booster compressor (141) immediately thereafter. Subsequently, the switching control section (202) maintains the halted state of the booster compressor (141) for a predetermined period of time (about 10 minutes, for example). During the halted state of the booster compressor (141), the freezer expansion valve (132) is kept to be opened fully.

Under this condition, the liquid refrigerant remaining in the freezer heat exchanger (131) during the defrosting operation is sucked out into the first gas side communication pipe (22). In detail, the liquid refrigerant in the freezer heat exchanger (131) flows into the bypass path (150) of the booster circuit (140), and then, flows into the first gas side communication pipe (22) via the four-way switch valve (142). The liquid refrigerant that flows from the booster circuit (140) into the first gas side communication pipe (22) is joined with the gas refrigerant that flows from the refrigerator heat exchanger (111) toward the variable capacitance compressor (41), is evaporated, and then, is sucked into the variable capacitance compressor (41).

In this way, the liquid refrigerant is discharged from the freezer heat exchanger (131) during the time when the switching control section (202) keeps the halted state of the booster compressor (141). The time period (set time) when the switching control section (202) keeps the halted state of the booster compressor (141) is set depending on a time required for discharging the liquid refrigerant thoroughly from the freezer heat exchanger (131). When the set time elapses, the switching control section (202) allows the booster compressor (141) to start. Hence, the liquid refrigerant remaining in the freezer heat exchanger (131) during the defrosting operation is prevented from being sucked into the booster compressor (141), thereby preventing damage to the booster compressor (141).

Effects of Embodiment 1

According to the refrigerating apparatus (10) of the present embodiment, not only the heat provided to the refrigerant in the booster compressor (141) but also the heat that the refrigerant absorbs from inside air in the refrigerator heat exchanger (111) can be utilized as heat for melting frost attaching to the freezer heat exchanger (131) during the defrosting operation. Hence, according to the present embodiment, a larger amount of heat that can be utilized for defrosting of the freezer heat exchanger (131) can be ensured than that in conventional apparatuses, with a result that a time required for defrosting the freezer heat exchanger (131) is remarkably reduced.

Moreover, in the refrigerating apparatus (10) according to the present embodiment, the refrigerant condensed in the freezer heat exchanger (131) during the defrosting operation is sent back to the refrigerator heat exchanger (111) so as to be utilized again for cooling the inside of the refrigerator. In other words, the refrigerant of which enthalpy is lowered in heat radiation in the freezer heat exchanger (131) is sent to the refrigerator heat exchanger (111), so as to be utilized for cooling the inside of the refrigerator. Further, the operation of the booster compressor (141) during the defrosting operation attains cooling ability in the refrigerator heat exchanger (111), with a result that power consumption in the variable capacitance compressor (41) can be reduced by the thus attained cooling ability. Hence, according to the present embodiment, the power consumption in the variable capacitance compressor (41) and the booster compressor (141) can be reduced and the power consumption of the refrigerating apparatus (10) is reduced, with a result of lowering the running cost thereof.

Moreover, in the refrigerating apparatus (10) of the present embodiment, the switching control section (202) temporally halts the booster compressor (141) at termination of the defrosting operation, so that the liquid refrigerant is discharged from the freezer heat exchanger (131) through the bypass path (150) during the halted state of the booster compressor (141). With this arrangement, the liquid refrigerant remaining in the freezer heat exchanger (131) during the defrosting operation is prevented surely from being sucked into the booster compressor (141), thereby surely preventing damage to the booster compressor (141) and increasing the reliability of the refrigerating apparatus (10).

Modified Example of Embodiment 1

While the refrigerator circuit (110) solely composes the first cooling circuit in the refrigerant circuit (20) in the above embodiment, the first cooling circuit may be composed in a manner that an additional booster unit is provided in the refrigerating apparatus (10) and the booster circuit of the thus added booster unit is connected in series to the refrigerator circuit (110).

In this modified example, for defrosting the refrigerator heat exchanger (111), the four-way switch valve of the added booster circuit is exchanged. The refrigerant evaporated in the freezer heat exchanger (131) is compressed in the booster compressor of the added booster circuit, and then, is supplied to the refrigerator heat exchanger (111). Further, the refrigerant condensed in the refrigerator heat exchanger (111) during the defrosting operation is supplied to the freezer heat exchanger (131) to be utilized for cooling the inside of the freezer showcase (15).

Embodiment 2

In Embodiment 2 of the present invention, the constitution of the outdoor circuit (40) is modified in the refrigerating apparatus (10) of Embodiment 1. In addition, in the refrigerating apparatus (10) of the present embodiment, two refrigerator showcases (13, 14) and one freezer showcase (15) are connected to the outdoor unit (11) and the air conditioning unit (12) is omitted. Herein, different features from Embodiment 1 will be described in the refrigerating apparatus (10) of the present embodiment.

Figure 8:
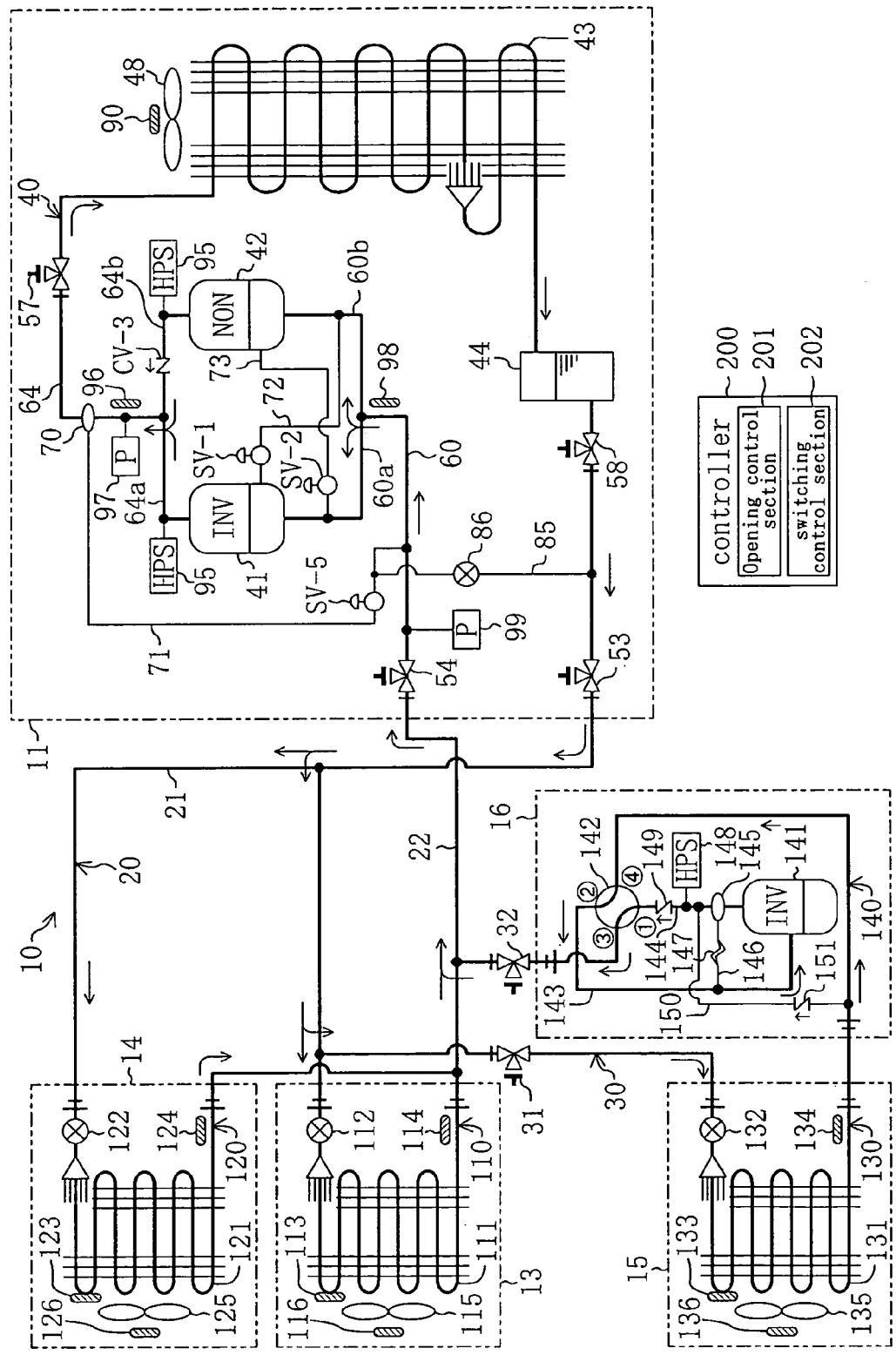
FIG. 8 is a schematic view of a refrigerating apparatus in Embodiment 2.

As shown in FIG. 8, an intake pipe (60) is connected to the variable capacitance compressor (41) and the fixed capacitance compressor (42). The intake pipe (60) is connected at one end thereof to the first gas side stop valve (54). The other end of the intake pipe (60) branches into two branch pipes (60a, 60b) so that the first branch pipe (60a) and the second branch pipe (60b) are connected to the intake side of the variable capacitance compressor (41) and the intake side of the fixed capacitance compressor (42), respectively. An intake temperature sensor (98) and an intake pressure sensor (99) are provided for the intake pipe (60). In the outdoor circuit (40) in the present embodiment, the first four-way switch valve (51) and the second four-way switch valve (52) are omitted and the discharge pipe (64) is connected to one end of the outdoor heat exchanger (43) via the stop valve (57). To the other end of the outdoor heat exchanger (43), the first liquid side stop valve (53) is connected via the receiver (44) and the stop valve (58). The second liquid side stop valve (55) and the second gas side stop valve (56) are omitted in this outdoor circuit (40).

In the outdoor circuit (40), the injection pipe (85) is connected at one end thereof to a pipe between the stop valve (58) and the first liquid side stop valve (53) and is connected at the other end thereof to the intake pipe (60). Further, the oil return pipe (71) is connected to the oil separator (70) and the intake pipe (60).

In the present embodiment, the first refrigerator showcase (13) has the same structure as that of the refrigerator showcase in Embodiment 1. Also, the second refrigerator showcase (14) has the same structure as that of the refrigerator showcase in Embodiment 1. In detail, a refrigerator heat exchanger (121) and a refrigerator expansion valve (122) are provided in a refrigerator circuit (120) of the second refrigerator showcase (14). Further, a heat exchanger temperature sensor (123), a refrigerant temperature sensor (124), a refrigerator fan (125) and a refrigerator temperature sensor (126) are provided for the second refrigerator showcase (14).

In the refrigerant circuit (20) in the present embodiment, the first liquid side communication pipe (21) is connected to the respective liquid side ends of the respective refrigerator circuits (110, 120) of the respective refrigerator showcases (13, 14) and to the liquid side stop valve (31) of the freezing circuit (30). On the other hand, the first gas side communication pipe (22) is connected to the respective gas side ends of the respective refrigerator circuits (110, 120) of the respective refrigerator showcases (13, 14) and to the gas side stop valve (32) of the freezing circuit (30).

In the refrigerating apparatus (10) of the present embodiment, inside air in the respective refrigerator showcases (13, 14) and the freezer showcase (15) are cooled. At that time, the four-way switch valve (142) of the booster circuit (140) is set to the first state (state shown in FIG. 8).

During this operation, the refrigerant discharged from the variable capacitance compressor (41) and the fixed capacitance compressor (42) radiates heat outdoors in the outdoor heat exchanger (43) to be condensed, and then, flows into the first liquid side communication pipe (21) to be distributed into the respective refrigerator circuits (110, 120) and the freezer circuit (130). Subsequently, the refrigerant evaporated in the respective refrigerator heat exchangers (111, 121) flows into the intake pipe (60) of the outdoor circuit (40) through the first gas side communication pipe (22). On the other hand, the refrigerant evaporated in the freezer heat exchanger (131) is compressed in the booster compressor (141), and then, flows into the intake pipe (60) of the outdoor circuit (40) through the first gas side communication pipe (22). The refrigerant that flows into the intake pipe (60) is sucked into the variable capacitance compressor (41) or the fixed capacitance compressor (42) to be compressed.

Figure 9:
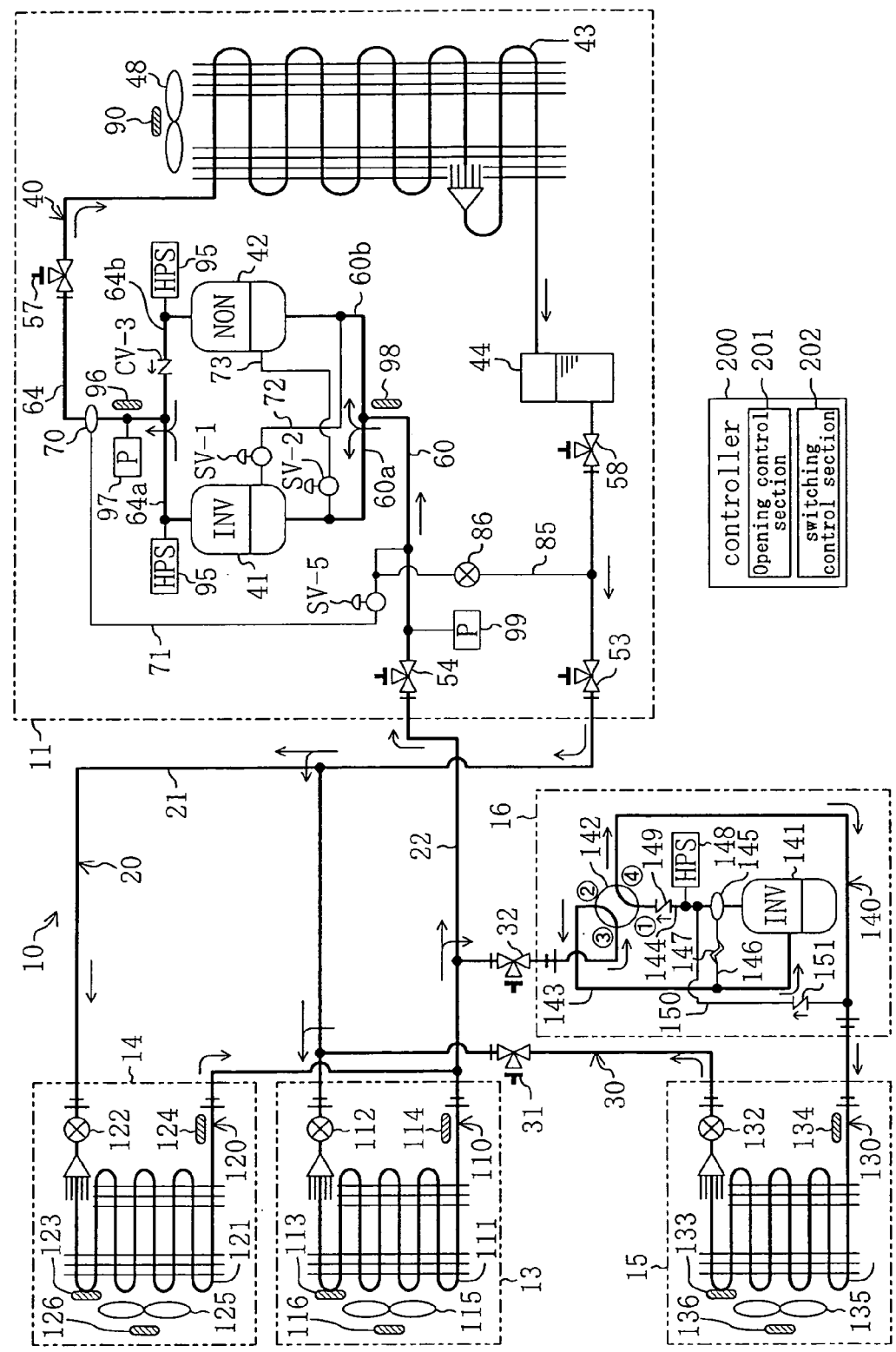
FIG. 9 is a schematic view showing a refrigerant flow during defrosting operation of the refrigerating apparatus in Embodiment 2.

In the refrigerating apparatus (10) of the present embodiment, the defrosting operation is also performed for defrosting the freezer heat exchanger (131). During the defrosting operation, as shown in FIG. 9, the four-way switch valve (142) of the booster circuit (140) is set to the second state.

Under this condition, part of the refrigerant evaporated in the respective refrigerator heat exchangers (111, 121) of the respective refrigerator showcases (13, 14) is latched into the booster circuit (140). The refrigerant latched in the booster circuit (140) is compressed in the booster compressor (141), and then, is supplied to the freezer heat exchanger (131). In the freezer heat exchanger (131), the thus supplied refrigerant radiates heat to be condensed, so that frost attaching to the freezer heat exchanger (131) is heated and melted. The refrigerant condensed in the freezer heat exchanger (131) flows into the first liquid side communication pipe (21) via the freezer expansion valve (132), which is opened fully, and then, is sent back to the refrigerator heat exchanger (111) of the first refrigerator showcase (13).

INDUSTRIAL APPLICABILITY

As described above, the present invention is useful for refrigerating apparatuses in which a plurality of heat exchangers are provided for cooling the inside of the refrigerator and the like.

The invention claimed is:

1. A refrigerating apparatus that is provided with a refrigerant circuit (20) in which a first cooling circuit (110, 120) including a first heat exchanger (111, 121) for cooling inside and a second cooling circuit (30) including a second heat exchanger (131) for cooling inside and a sub compressor (141), which are connected in series, are connected in parallel to a heat source side circuit (40) including a heat source side heat exchanger (43) and a main compressor (41) and that performs a refrigeration cycle by circulating refrigerant in the refrigerant circuit (20), wherein in the refrigerant circuit (20), a switching mechanism (142) is provided which switches between a first operation where the sub compressor (141) sucks the refrigerant from the second heat exchanger (131) and discharges it to an intake side of the main compressor (41) and a second operation where the sub compressor (141) sucks the refrigerant from the first heat exchanger (111, 121) and discharges it to the second heat exchanger (131), and during defrosting operation for defrosting the second heat exchanger (131), the second operation is performed in the refrigerant circuit (20) and the refrigerant is sent from the second heat exchanger (131) to the first heat exchanger (111, 121).

2. The refrigerating apparatus of claim 1, wherein
an expansion valve (132) of which opening is variable is provided in the second cooling circuit (30), and
control means (201) is provided which keeps the expansion valve (132) to be opened fully during the defrosting operation.

3. The refrigerating apparatus of claim 1, wherein
in the refrigerant circuit (20), a bypass path (150) is provided through which the refrigerant passes bypassing the sub compressor (141) only during a halted state of the sub compressor (141), and
control means (20) is provided which halts once the sub compressor (141) when the second operation is exchanged to the first operation at termination of the defrosting operation, and then, starts the sub compressor (141) after a predetermined time period elapses.

* * * * *